United States Patent [19]

Takekoshi et al.

[11] 3,855,181

[45] Dec. 17, 1974

[54] ARYL METHYLENE POLYMERS PREPARED FROM CHLORAL, BROMAL OR GLYOXALIC ACID

[75] Inventors: Tohru Takekoshi, Scotia; Jimmy L. Webb, Ballston Lake, both of N.Y.

[73] Assignee: General Electric Company, Schenectady, N.Y.

[22] Filed: Mar. 20, 1973

[21] Appl. No.: 343,138

[52] U.S. Cl............ 260/49, 117/128.4, 117/132 BF, 117/161 L, 161/198, 161/205, 161/257, 260/3.14, 260/17.2, 260/30.4 R, 260/30.8 DS, 260/32.6 R, 260/33.8 R, 260/38, 260/48, 260/52, 260/67 A, 260/675, 260/831, 260/838
[51] Int. Cl......... C08g 5/02, C08g 7/00, C08g 1/12
[58] Field of Search............ 260/49, 52, 67 S, 67 A, 260/48

[56] References Cited
UNITED STATES PATENTS
2,426,417   8/1947   Searle .......................... 424/357 X

OTHER PUBLICATIONS

Noller, Chemistry of Organic Compounds, 1958, pp. 739, 812. Chem. Abstracts, Vol. 70, 1969, 37519x, Gadzhiev, et al.

J. of Am. Chem. Soc. (3Acs), Vol. 69, 1947, pp. 1,172–1,173, Niederl, et al.

Chem. Abstracts, Vol. 43, 1949, 2979f–i, 2980a–g, Musantie et al.

Chem. Abstracts, Vol. 66, 1967, 18891js Moto et al.

*Primary Examiner*—Howard E. Schain
*Attorney, Agent, or Firm*—Joseph T. Cohen; Jerome C. Squillaro

[57] ABSTRACT

Aryl methylene polymers are prepared from the reaction of an aromatic compound containing nuclear bonded hydrogen and either chloral, bromal, or glyoxalic acid in the presence of a strong acidic catalyst.

7 Claims, No Drawings

ARYL METHYLENE POLYMERS PREPARED FROM CHLORAL, BROMAL OR GLYOXALIC ACID

This invention is concerned with aryl methylene polymers and methods for making the same. More particularly, the invention relates to a polymeric composition composed of recurring structural units of the formula I 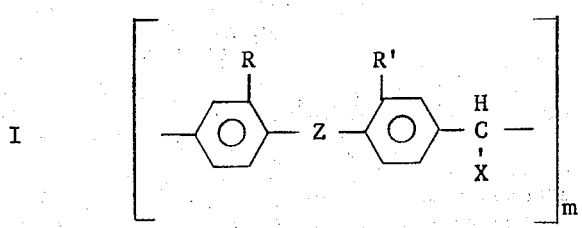

where R and R' are members selected from the class consisting of hydrogen, halogen (e.g., chlorine, bromine, fluorine, etc.) and the methyl radical, X is a member selected from the class of —COOH and —CY$_3$ radicals, Z is a direct bond or is a member selected from the class consisting of —O—, —S—, divalent alkyl hydrocarbon radicals of from 1 to 4 carbon atoms, the —O—

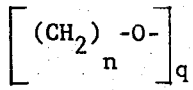

radical, and divalent radicals of the general formula

II 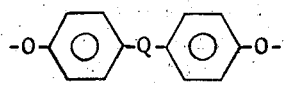

where Y is chlorine or bromine, Q is a member of the class of —O—, —S—, —SO$_2$—,

and divalent alkyl radicals of from 1 to 4 carbon atoms, $m$ is a whole number in excess of 1, for instance, 10 to 1,000 or more, and $n$ and $q$ are whole numbers from 1 to 2, inclusive.

The invention is also concerned with a process for making the aforesaid polymers of formula I which comprises reacting an aromatic compound of the general formula III 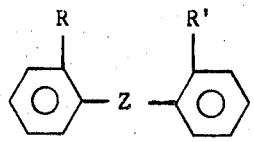

with a carbonyl compound of the formula

IV       $\overset{O}{\underset{}{HC-X}}$ or its hydrated form

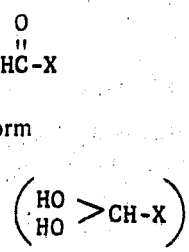

in the presence of a strongly acidic catalyst, where R, R', X, and Z have the meanings given above.

It has been known in the past that aromatic compounds such as benzene, diphenyl oxide, etc., can be reacted with materials such as chloral to form simple compounds by a condensation reaction. We have now discovered that the reaction of aromatic compounds containing nuclearly bonded hydrogen with chloral, bromal and glyoxalic acid (hydrates of these carbonyl compounds are intended to be included in the definition of "carbonyl compounds"), can be carried out in such a manner that instead of obtaining simple compounds, one is able to obtain polymers of considerable molecular weight and intrinsic viscosity. The key to obtaining the polymeric compositions, in contrast to the simple chemical compounds obtained in the past, resides in the use of a certain class of strong acidic catalysts hereinafter defined by carrying out the reaction. By means of such conditions, one is able to obtain high molecular weight, linear polymers capable of forming strong films and capable of being molded to form useful products in the molding, insulation, and protective arts.

Among the aromatic compounds of formula III which can be employed in the practice of the present invention may be mentioned:
diphenyloxide,
diphenylsulfide,
diphenylmethane,
1,2-diphenylethane,
1,2-diphenoxyethane,
1,3-diphenoxypropane,
1,2-bis(2-methylphenoxy)ethane,
2,2-diphenylpropane,
1,2-bis(2-chlorophenoxy)ethane,
1-phenoxy-2-(2-methylphenoxy)ethane,
4,4'-bis(2-methylphenoxy)diphenyl sulfide,
4,4'-bis(2-chlorophenoxy)diphenyl sulfide,
4,4'-bis(2-bromophenoxy)diphenyl oxide,
bis-1,2-(phenoxyethoxy)ethane,
bis(2-methylphenyl) oxide,
bis(2-methylphenyl) sulfide,
bis(2-chlorophenyl) oxide,
bis(2-bromophenyl) oxide,
4,4'-bis(phenoxy)diphenylsulfone,
4,4'-bis(2-methylphenoxy)diphenyl sulfone,
4,4'-diphenoxy benzophenone,
bis-1,2(2-chlorophenoxy)ethane.

Among the radicals which formula II may represent are, for instance,

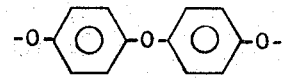

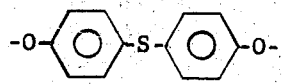

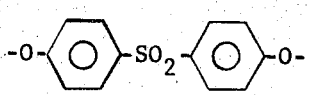

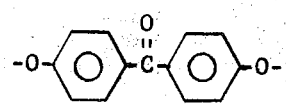

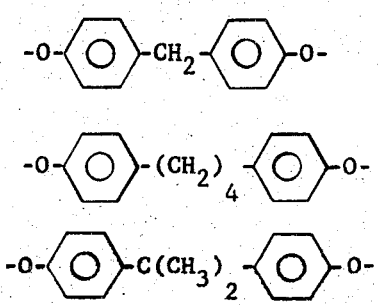

The term "strong acidic catalyst" as employed in the practice of the present invention is intended to mean a certain class of acidic agents (including anhydrides of the acids) whose acid strength as measured on the Hammett $H_o$ scale, is at least as strong as trifluoroacetic acid. On the Hammett $H_o$ scale, the values are called Hammett $H_o$ acidity functions and range from positive to negative numbers. The more negative the value, the stronger the acid. For a more complete discussion of the Hammett $H_o$ acidity functions, reference is made to the book "Acidity Functions" by Colin H. Rochester, Academic Press, N.Y. (1970). This book and its references are hereby incorporated by reference for a teaching concerning acidity functions of various acids and the factors which govern acidity functions of various systems in which the acids are dissolved.

Since water is produced in the condensation of the aromatic compound and the carbonyl compound, the amount of acidic medium or acidic catalyst which can be used should be enough to maintain the acidity of the system as described above. Generally, the concentration of the acidic catalyst should be present in an amount equal to at least 15 to 20 mol percent of the molar concentration of the aromatic compound or carbonyl compound. Larger molar concentrations of the acidic catalyst are often advantageously employed in order to increase the rate of reaction. Excess amounts of the acidic catalyst can additionally be used as solvents for the reaction.

Among the acidic (including anhydride) catalysts which are useful in the preparation of the polymers of the instant invention may be mentioned the following where the parenthesis figure is the value on the Hammett $H_o$ scale: trifluoroacetic acid (−3.3), trifluoroacetic anhydride, methanesulfonic acid (−8.0), trifluoromethanesulfonic acid (−14.0), trifluoromethane sulfonic anhydride, monofluorophosphoric acid, difluorophosphoric acid (−8.0), hydrogen fluoride (−11.9), boron trifluoride, fluoroboric acid, etc. Mixtures of the aforesaid acids can also be used.

Highly acidic media which might be expected to work have been unexpectedly found to be either ineffective or of no value. For example, aluminum trichloride forms intermediate carbinols (as in U.S. Pat. No. 2,426,417) which complex with the aluminum chloride to form stable products and therefore prevent polycondensation. The use of sulfuric acid causes sulfonation of the aromatic rings of the aromatic monomers. Even nitric acid, strongly acidic as it is, is of no value because it causes nitration and oxidation of the reactants and reaction products.

The means whereby polymers herein defined and the process for making such compositions may be practiced can be varied widely and to a considerable extent depend on the aromatic and carbonyl compounds used and the acidic catalyst employed. Generally, approximately 1 mol of the aromatic compound is used per mol of the carbonyl compound. slight variations in molar excesses may be employed so that generally one reactant may be in a molar excess of about 0.001 to 0.05 mol over the other reactant. Persons skilled in the art will have no difficulty in determining the conditions for making the polymeric compositions of formula I.

The temperatures at which reaction is caused to take place can also be varied widely and are advantageously within the range of from about 0°C to 100°C, although it is possible to employ lower or higher temperature conditions depending on the ingredients used, the reaction products sought, time of reaction, the kind and concentration of the acidic catalyst or medium, etc. In addition to using atmospheric pressure, superatmospheric pressures and subatmospheric pressures may be employed again depending upon the other conditions of reaction, the ingredients used, the speed at which it is desired to effect reaction, etc.

The time of reaction can be varied within a wide range, depending on the ingredients used, the temperature, the acidic catalyst and concentration of the latter, etc. It has been found that times varying from about 15 minutes to as much as 10 to 15 hours are usually sufficient to obtain the desired yield and completion of the reaction.

Generally, common inert solvents (i.e., inert to the reactants and reaction product) are advantageously employed in the practice of the invention. Among such solvents may be mentioned, for instance, nitrobenzene, chlorobenzene, trichloroethylene, tetrachloroethane, orthodichlorobenzene, methylene chloride, chloroform, trifluoroacetic acid or anhydride, etc. Although solvents are not absolutely essential, it has been found that the solvent (which can vary widely in concentration) acts as a diluent to reduce the viscosity and medium for more intimate contact between the reactants, and also allows the acidic catalyst to exert its maximum influence on the course of the reaction. Also it is possible by the use of solvents to maintain better control of the reaction which is often exothermic. Mixtures of solvents can be employed but one of the unexpected findings is that the presence of nitrobenzene either as the sole solvent, or in the form of a mixture of solvents, where the nitrobenzene constitutes at least 25%, by weight, of the total weight of the solvents, unexpectedly yields polymers of higher intrinsic viscosities than where the nitrobenzene is omitted or the nitrobenzene is in a quantity less than the aforesaid 25 weight percent. In general, the amount of solvent can vary from 10 to 100%, or more, by weight, based on the weight of the reactants.

Once the reaction is carried out, the polymerization is usually terminated by pouring the reaction mixture into a suitable non-solvent for the polymer, such as methanol. The polymer which generally precipitates, can be removed by filtration, washed with additional methanol, and then dried in vacuum at temperatures ranging from about 50° to 80°C. Redissolving the polymer in solvents therefor, such as chloroform, and reprecipitation with methanol will give still purer, less colored polymers.

In order that those skilled in the art may better understand how the present invention may be practiced, the following examples are given by way of illustration and not by way of limitation.

For brevity, in the following examples and tables the reactants used will be identified as follows:

CHART 1

Cb1 — Chloral
Cb2 — glyoxalic acid
Cb3 — glyoxalic acid hydrate

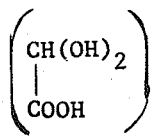

TFA — trifluoroacetic acid
TFAA — trifluoracetic anhydride
NB — nitrobenzene
TCE — 1,1,2,2-tetrachloroethane
DCB — o-dichlorobenzene
CF — $CHCl_3$
MC — methylene chloride
DMF — dimethyl formamide
THF — tetrahydrofuran
MSA — methanesulfonic acid The intrinsic viscosities [$\eta$] in the examples and tables were measured at 25°C in chloroform unless otherwise indicated. The thermal gravometric analyses (TGA) were measured at a heating rate of 10°C per minute; the temperature at which weight loss began is identified as $T_{d_0}$; the temperature at which 5% weight loss occurred is identified as $T_{d_5}$. The glass transition temperature ($T_g$) was measured by differential scanning calorimetry.

For consistency, the test numbers assigned in the following examples and tables will be the same both for the polymers obtained in the polymerization reaction and also for the properties of the same polymers. All reactions were conducted under a nitrogen blanket.

EXAMPLE 1

About 20.9 grams (0.13 mol) chloral hydrate and 20 ml TFA were placed in a reaction vessel equipped with nitrogen inlet, condenser, stirrer, thermometer, addition funnel and a gas inlet tube. Thereafter, under a nitrogen blanket, 26.5 grams (0.013 mol) TFAA was added dropwise through the addition funnel over a period of one-half hour. Diphenyl ether in an amount equal to 21.48 grams (0.13 mol) and 60 ml TCE were added and the solution heated at 70° C for about 2 ½ hours. After cooling to room temperature, additional TFAA (20 grams, 0.095 mol) was added dropwise over a period of 0.5 hour. $BF_3$ gas was then bubbled into the solution at the rate of one bubble per second for one hour and the solution heated at 70°C for about 8 hours. The addition of $BF_3$ at room temperature was repeated four times with subsequent heating of the solution for 8, 7, 7, and 16 hours, respectively. The solution was cooled to room temperature, diluted with 200 ml chloroform, and 2,000 ml methanol was added to precipitate the polymer. The precipitated polymer was removed by filtration, washed with methanol and dried in vacuum at 50°C to yield 34.61 grams (92.0% yield) of a colorless polymer which had an intrinsic viscosity of 0.67 dl/g. Analysis of the composition established it to be composed of recurring units of the formula V 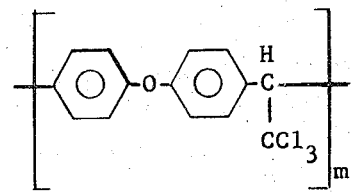

where $m$ is a whole number greater than 1. The elemental analyses were as follows:

|  | Found | Theoretical |
|---|---|---|
| % C | 56.3 | 56.13 |
| % H | 2.95 | 3.03 |
| % Cl | 35.03 | 35.49 |

The polymer had a $T_g$ of 212°C and a TGA in air of 277°C.

EXAMPLE 2

In this example, 6.26 grams (0.016 mol) 4,4'-diphenoxydiphenylsulfone, 1.45 grams (0.16 mol) glyoxalic acid hydrate and 40 ml TFA were placed in a reaction vessel similarly as in Example 1 under a nitrogen blanket. The mixture was stirred at 40°C for 0.5 hour to form a colorless, homogeneous solution which was then cooled to 30°C and 1 ml MSA was added. The resulting mixture was heated at 60°C for 9 hours at which point 4 ml additional MSA was added and heating continued for 10 hours at 65°–70°C. At this point some phase separation occurred which was cured by the addition of 10 ml of TFA and 3 ml of MC. Finally, an additional 4 ml MSA was added and the solution was heated for 1 hour at 65°C. The resulting polymer was worked up in the same manner as in Example 1 to yield 6.65 grams (93.2% yield) of product. This polymer was soluble in dimethyl sulfoxide, dimethyl formamide, and N-methyl pyrrolidone, and could be cast from solution to give a colorless, transparent, flexible, strong film. The polymer had a $T_g$ of 211°C and a TGA in air of 310°C. The polymer was identified as being composed of recurring structural units of the formula VI 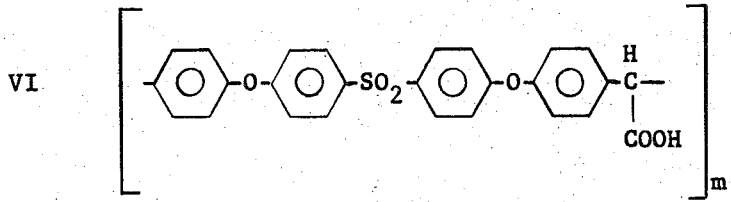

where *m* is a whole number in excess of 1.

EXAMPLE 3

1,2-bis(2-methylphenoxy)ethane (11.68 grams, 0.05 mol), glyoxalic acid hydrate (4.49 grams, 0.05 mol) and 60 ml TFA were placed in a reaction vessel similarly as in Example 1. The exothermic reaction which took place raised the temperature of the mixture, which was then stirred at 35°C for 20 minutes. The resulting viscous solution was diluted with 10 ml of TFA and stirred for an additional 10 minutes. Thereafter the reaction mixture was poured into water, the polymer which precipitated was isolated, washed several times with water and dried to yield 14.09 grams (98% yield) of a polymer composed of recurring structural units of the formula

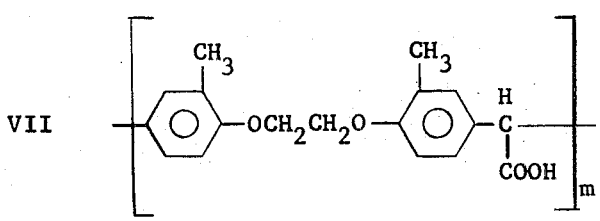

where *m* is a whole number in excess of 1. This polymer could be cast from a DMF solution to form tough, transparent films.

EXAMPLE 4

About 25.5 grams (0.165 mol) biphenyl, 24.4 grams (0.166 mol) chloral and 250 ml nitrobenzene were placed in a reaction vessel similarly as in the preceding examples and the mixture was stirred at 5°C while BF$_3$ gas was introduced at a rate of 0.5 ml/second for two hours. BF$_3$ was further bubbled through the solution for 2 hours at 25°C, 2 hours at 40°C and finally 6 hours at 50°C. The reaction mixture was added to methanol and the white polymer which precipitated was washed with methanol and dried to yield 46.4 grams (99% yield) of polymer. This polymer by analysis was found to be composed of recurring structural units of the formula

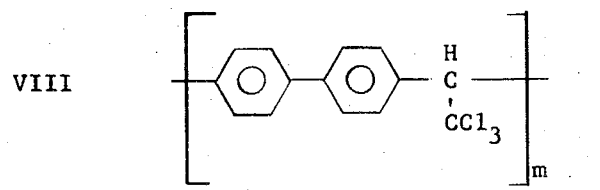

where *m* is a whole number greater than 1. This polymer had a TGA in air and nitrogen of 250°C. Analysis established the structure as follows:

|  | Found | Theoretical |
| --- | --- | --- |
| % C | 61.1 | 59.3 |
| % H | 3.4 | 3.2 |
| % Cl | 37.2 | 37.5 |

EXAMPLE 5

To a reaction vessel were added about 3.59 grams (0.024 mol) chloral, 5.90 grams (0.024 mol) 1,2-bis(2-methylphenoxy) ethane and 80 ml nitrobenzene. The mixture was cooled to 14°C and 18.34 grams of hydrogen fluoride was added. The mixture was stirred at room temperature and after one hour an additional 12.63 grams hydrogen fluoride was added at which time the stirring was continued at 14°C for 20 hours. The polymer was then precipitated with methanol, dissolved in CHCl$_3$ and reprecipitated with methanol several times, and then dried to yield 7.5 grams of a white polymer having an intrinsic viscosity of 0.33 dl/g and being composed of recurring structural units of the formula

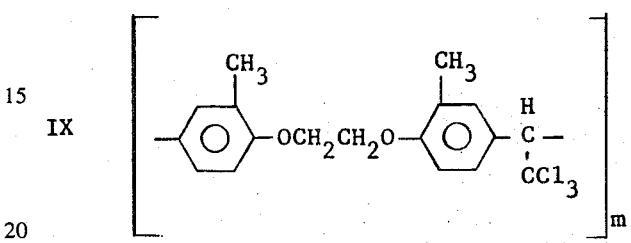

where *m* is a whole number greater than 1. A flexible film was obtained by casting this polymer from a methylene chloride solution.

When Example 5 was repeated in essentially the same manner with the exception that 80 ml chlorobenzene was used in place of nitrobenzene, a white polymer was obtained in a yield of 9 grams (98% yield) having an intrinsic viscosity of 0.28 dl/g. A flexible film was again obtained by casting from a methylene chloride solution.

EXAMPLE 6

10.985 grams (0.048 mol) 1-phenoxy-2-(2-methylphenoxy) ethane, 7.091 grams (0.048 mol) chloral, and 150 ml nitrobenzene were placed in a reaction vessel under a nitrogen atmosphere, cooled to about 10°C and BF$_3$ gas introduced into the mixture at the rate of approximately 1 ml/sec. for 40 minutes during which time the viscosity of the reaction mixture increased greatly. The polymerization was terminated by pouring the reaction mixture into methanol and the polymer which precipitated was isolated and washed in pulverized form with methanol, filtered and dried in vacuum at 60°C to give 16.1 grams (93.5% yield) of a polymer composed of recurring structural units of the formula

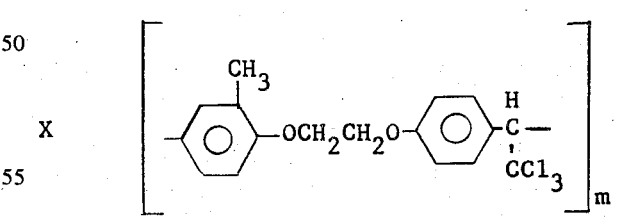

where m is a whole number greater than 1. This polymer had an intrinsic viscosity of 0.43 dl/g in chloroform. The TGA was 290°C in air and 305°C in nitrogen while the glass transition temperature was about 117°C. The structure of the polymer was identified by the following analysis:

|  | Found | Theoretical |
| --- | --- | --- |
| % C | 56.9 | 57.08 |
| % H | 4.5 | 4.23 |
| % Cl | 29.0 | 29.73 |

EXAMPLE 7

17.268 grams (0.061 mol) 1,2-bis(2-chlorophenoxy)ethane, 180 ml nitrobenzene, and 8.9849 grams (0.061 mol) chloral were placed in a reaction vessel similarly as in Example 1, the mixture was stirred and cooled to 10°C, at which point boron trifluoride gas was introduced into the reaction mixture at the rate of 1 ml/sec. After ½ hour, the temperature of the reaction mixture was allowed to rise to room temperature at which point $BF_3$ gas was continuously added for an additional 4.5 hours with stirring. The polymer was poured into methanol, the precipitate isolated and washed in methanol and dried to yield 25.19 grams (99.8% yield) of a polymer composed of recurring structural units of the formula

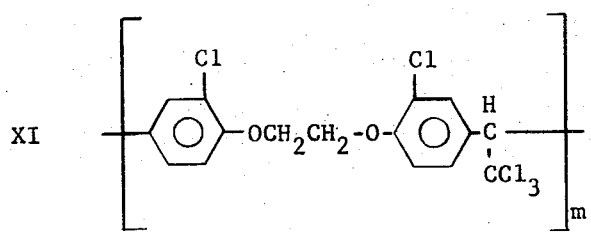

where $m$ is a whole number greater than 1. This polymer had an intrinsic viscosity in chlorobenzene of 0.16 dl/g, a TGA of 305°C in air and 315°C in nitrogen, and a $T_g$ of 119°C. The identity of the polymer was established by the following analyses:

|      | Found | Theoretical |
|------|-------|-------------|
| % C  | 47.3  | 46.58       |
| % H  | 2.9   | 2.69        |
| % Cl | 41.7  | 42.97       |

EXAMPLE 8

A copolymer was prepared by placing 2.65 grams (0.0156 mol) diphenyl ether, 4.76 grams (0.031 mol) chloral, and 40 ml nitrobenzene in a reaction vessel, and the mixture cooled (in a bath) to 5°C. $BF_3$ gas was introduced into the mixture at the rate of one bubble per second for 10 minutes. Thereafter 3.765 grams (0.0155 mol) 1,2-bis(2-methylphenoxy)ethane in 50 ml of nitrobenzene was added to the above reaction mixture, at which time the temperature rose to 11°C. Additional $BF_3$ gas was added to the reaction mixture for an additional 20 minutes. The cooling bath was then removed and polymerization with stirring was continued at room temperature for an additional 3 hours. The reaction mixture was poured into methanol, the precipitated polymer was collected and washed with methanol and dried to yield 10.29 grams (99.3% yield) of a polymer composed of recurring structural units of the formula in Example 1 and the formula in Example 3. The intrinsic viscosity of this polymer was 0.32 dl/g in chlorobenzene.

EXAMPLE 9

Employing the techniques and procedures outlined in Examples 1 to 8, various aromatic compounds and carbonyl compounds were interreacted in the presence of different acidic catalysts employing various conditions of temperature and time. The following Table 1 recites the reactants and the conditions of reaction for making the polymers, while Table 2 describes the analyses on and the properties of the polymer.

It also is possible in making the polymers included in the scope of the present invention to employ an intermediate compound constituting the condensation product of an aromatic compound and a carbonyl compound and thereafter subjecting this intermediate compound to polymerization conditions the same as those used for the individual reactants. The following example illustrates this method of making the polymeric materials.

TABLE I

| Test No. | Reactants – Aromatic Compound | Carbonyl Comp. | Polymerization Conditions – Solvent | Catalyst | Temp °C | Time (Hr.) | Yield % | η (dl/g) |
|---|---|---|---|---|---|---|---|---|
| 1 | ⌬-OCH₂CH₂-O-⌬ | Cb1 | NB | $BF_3$ | 10 | 2.5 | 98.9 | 0.55 |
| 2 | Same as 1 | Cb3 | TFA | MSA | 25 | 2.0 | 98.7 | 0.57 (CF) |
| 3 | CH₃-⌬-OCH₂CH₂-O-⌬-CH₃ | Cb1 | NB | $BF_3$ | 5 | 0.75 | 98.6 | 0.81 |
| 4 | Same as 3 | Cb3 | TFA | TFA | 35 | 0.5 | 98.0 | 0.54 (MC) |
| 5 | CH₃-⌬-OCH₂CH₂-O-⌬ | Cb1 | NB | $BF_3$ | 10 | 0.75 | 93.5 | 0.43 (CF) |
| 6 | ⌬-O-⌬ | Cb1 | NB | $BF_3$ | 25 | 7.5 | 96.9 | 0.33 |

TABLE I (continued)

| Test No. | Reactants Aromatic Compound | Carbonyl Comp. | Solvent | Catalyst | Temp °C | Time (Hr.) | Yield % | η (dl/g) |
|---|---|---|---|---|---|---|---|---|
| 7. | Same as 6 | Cb3 | TCE | TFA MSA | 75 | 3.3 | 89.8 | — |
| 8. | Same as 6 | O=HC-CBr$_3$ | NB | BF$_3$ | 25 | 5.5 | 97.0 | 0.10 (THF) |
| 9. | Cl-⌬-S-⌬ Cl | Cb1 | NB | BF$_3$ | 25 | 54 | 96.0 | 0.24 |
| 10. | ⌬-OCH$_2$CH$_2$O-⌬ | Cb1 | NB | BF$_3$ | 26 | 5.0 | 99.8 | 0.16 |
| 11. | ⌬-(-OCH$_2$CH$_2$-⌬)$_2$ (with C(CH$_3$)$_2$) | Cb1 | NB | BF$_3$ | 20 | 0.5 | 86.2 | 0.25 |
| 12. | CH$_3$-⌬-OCH$_2$CH$_2$-⌬ (with C(CH$_3$)$_2$) | Cb1 | NB | BF$_3$ | 15 | 0.25 | 99.3 | 0.42 |
| 13. | (⌬-O-⌬-SO$_2$)$_2$ | Cb3 | TFA | MSA | 70 | 30 | 93.2 | — |
| 14. | (CH$_3$-⌬-O-⌬-SO$_2$)$_2$ | Cb3 | TFA | MSA | 60 | 14 | 97.6 | 0.43 (DMF) |
| 15. | Same as 14 | Cb1 | NB | BF$_3$ | 26 | 3.5 | 96.0 | 0.11 |
| 16. | (Cl-⌬-O-⌬-SO$_2$)$_2$ | Cb3 | CF | MSA TFAA BF$_3$ | 65 | 27 | 94.5 | 0.29 (DMF) |

TABLE II

| Test No. | Percent Elemental Analyses Found | | | TGA (°C) | | | | $T_g$ °C |
|---|---|---|---|---|---|---|---|---|
| | C | H | Cl | Air | | N$_2$ | | |
| | | | | $T_{d_0}$ | $T_{d_5}$ | $T_{d_0}$ | $T_{d_5}$ | |
| 1. | 55.9 | 3.9 | 30.0 | 230 | 295 | 230 | 305 | 126 |
| 2. | 69.5 | 5.21 | — | 320 | 355 | 330 | 360 | 136 |
| 3. | 57.9 | 4.45 | 28.1 | 260 | 311 | 260 | 311 | 120 |
| 4. | 71.9 | 6.1 | — | 290 | 360 | 320 | 370 | 137 |
| 5. | 56.9 | 4.5 | 29.0 | 240 | 290 | 250 | 305 | 117 |
| 6. | 56.3 | 2.95 | 35.0 | 240 | 275 | 240 | 290 | 212 |
| 7. | 72.8 | 4.7 | — | 270 | 310 | 270 | 340 | 177 |
| 8. | 39.8 | 2.2 | 55.1(Br) | 200 | 247 | 200 | 247 | — |
| 9. | 53.2 | 3.0 | 33.8 | 290 | 323 | 290 | 323 | 174 |
| 10. | 47.3 | 2.9 | 41.7 | 255 | 305 | 255 | 315 | 199 |

TABLE II—Continued

| Test No. | Percent Elemental Analyses Found | | | TGA(°C) | | | | $T_g$ °C |
|---|---|---|---|---|---|---|---|---|
| | | | | Air | | $N_2$ | | |
| | C | H | Cl | $T_d$ | $T_d$ | $T_d$ | $T_d$ | |
| 11. | 55.4 | 4.4 | 29.1 | 220 | 281 | 220 | 281 | 90 |
| 12. | 57.7 | 4.8 | 25.4 | 222 | 281 | 222 | 300 | 80 |
| 13. | 66.7 | 4.0 | 7.3 | 310 | 340 | 313 | 340 | 211 |
| 14. | — | — | — | 310 | 360 | 318 | 344 | 205 |
| 15. | 60.4 | 3.9 | 5.8(S) 18.0(Cl) | 270 | 335 | 270 | 335 | 203 |
| 16. | 58.3 | 3.3 | 6.3(S) 13.1(Cl) | 310 | 348 | 320 | 353 | 195 |

EXAMPLE 10

The compound having the formula

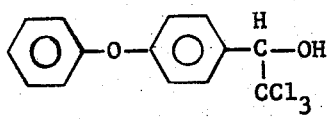

(which can be prepared in accordance with the directions described in U.S. Pat. No. 2,462,417 by effecting reaction between diphenyl ether and chloral in the presence of aluminum chloride) was treated in a DCB solvent with a mixture of $BF_3$ gas, trifluoromethane sulfonic acid at a temperature of about 26°C for about 4.5 hours. The polymer was worked up similarly as in the previous examples to obtain a polymeric composition in a yield of about 70.4% composed of the same recurring structural units as in Example 1, and having an intrinsic viscosity of 0.32 dl/g.

It will of course be apparent to those skilled in the art that having formed a polymer from an aromatic compound and the carbonyl compound consisting of glyoxalic acid (or the hydrate thereof) this polymer can be esterified to form ester polymers of the generic formula

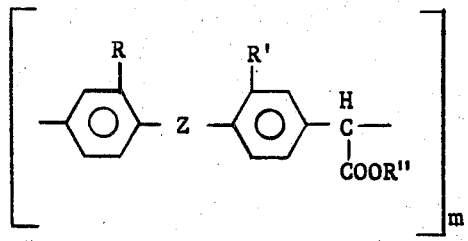

where R'' is a monovalent hydrocarbon of from 1 to 6 carbon atoms, and R, R', Z and m have the meanings above. The following example shows the preparation of such ester polymers.

EXAMPLE 11

About 10.01 grams of the polymer obtained in Example 3 was dissolved in a mixture of 200 ml chlorobenzene, 95 ml methanol and 0.1 ml 98% sulfuric acid. The solution was heated at about 60°C for 20 hours, neutralized with 0.1 gram $Na_2CO_3$ in 10 ml water, and then concentrated in vacuum. The resulting concentrate was precipitated in hexane, and the polymer which settled out was washed with water to yield 10.29 grams (98% yield) of a polymeric composition composed of recurring structural units of the formula

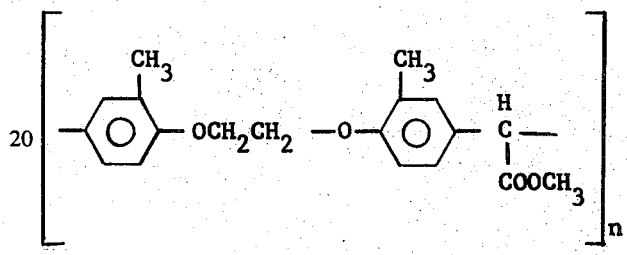

where n is a whole number in excess of 1. This polymer had an intrinsic viscosity of 0.54 dl/g ($CH_2Cl_2$), a $T_g$ of 82°C, a TGA in air of 310°C and in nitrogen of 350°C.

It will be obvious that other ester polymers (as well as amide polymers using $NH_3$ or $RNH_2$) can be made from other alcohols in combination with the polymers derived from the aromatic compound and the glyoxalic acid.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to work-loading at elevated temperatures for long periods of time. Films formed from the polymeric compositions of this invention may be used in applications where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings; in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommend these polymers (which advantageously have an intrinsic viscosity $[\eta]$ of at least 0.10 dl/g when measured in $CHCl_3$) include their use as binders for asbestos fibers, carbon fibers, and other fibrous materials in making brakelinings. In addition, molding compositions and molded articles may be formed from the polymeric compositions in this invention by incorporating such fillers, as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

The compositions herein defined may suitably be incorporated in other materials to modify the properties of the latter or in turn their properties may be modified by the incorporation of the other material. For example, they may be compounded with substances such as natural or synthetic rubbers; synthetic resins such as epoxy resins, phenolaldehyde resins, urea-aldehyde resins, alkyd resins, etc.; cellulosic material such as paper, inorganic and organic esters of cellulose such as cellulose acetate; cellulose ether, such as methyl cellulose, ethyl cellulose, benzyl cellulose, etc. In some instances, plasticizers and other modifying agents may be used in combination with the claimed polymers. These polymers containing halogen, including low molecular weight products, thereof are useful themselves or as additives to other polymers for producing products having low flammability.

It will of course be apparent to those skilled in the art that in addition to the compositions specifically referred to in the foregoing examples, other aromatic compounds, carbonyl compounds, solvents, catalysts, etc., many examples of which have been described above, may be employed without departing from the scope of the invention. The processing techniques may be varied widely employing the many conditions recited previously.

What we claim as new and desire to secure by Letters Patent of the United States is:

1. A polymer composed of recurring units of the formula

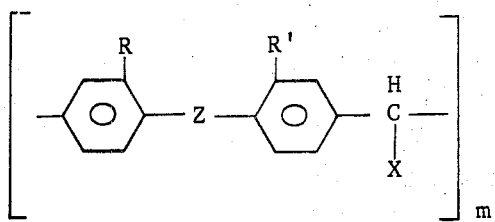

where R and R' are members selected from the class consisting of hydrogen, halogen, and the methyl radical, X is a member selected from the class of —COOH and —$CY_3$ radicals, Z is a direct bond or is a member selected from the class consisting of —O—, —S—, the

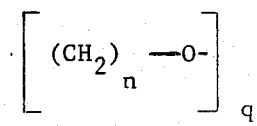

radical, and divalent radicals of the general formula

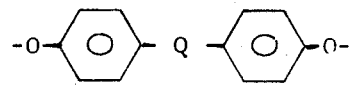

where Y is chlorine or bromine, Q is a member of the class of —O—, —S—, —$SO_2$—,

and divalent alkyl radicals of from 1 to 4 carbon atoms, $m$ is a whole number in excess of 1, and $n$ and $q$ are whole numbers from 1 to 2, inclusive.

2. A polymer as in claim 1 composed of recurring structural units of the formula

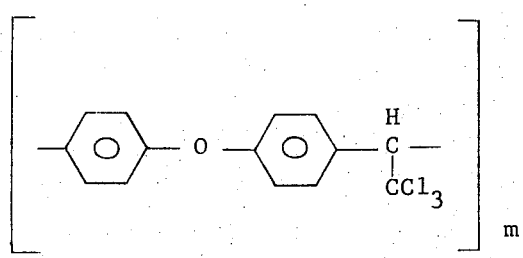

where $m$ is a whole number greater than 1.

3. A polymer as in claim 1 composed of recurring structural units of the formula

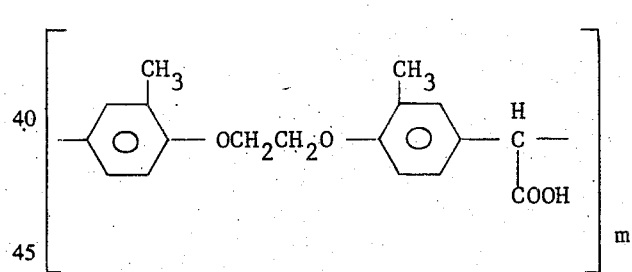

where $m$ is a whole number greater than 1.

4. A polymer as in claim 1 composed of recurring structural units of the formula

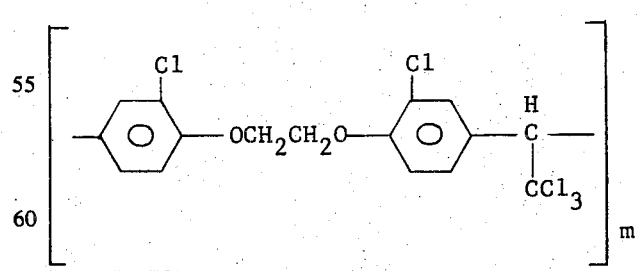

where $m$ is a whole number greater than 1.

5. A polymer as in claim 1 composed of recurring structural units of the formula

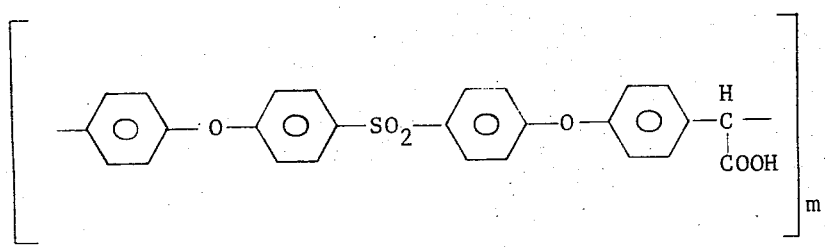
where *m* is a whole number greater than 1.
6. A polymer as in claim 1 composed of recurring structural units of the formula
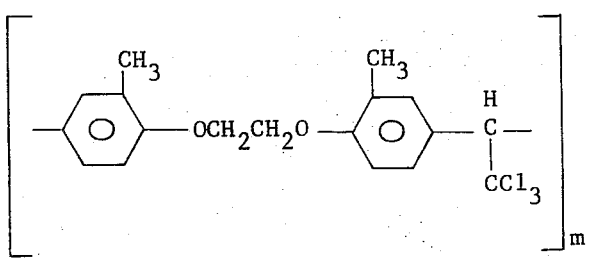
where *m* is a whole number greater than 1.
7. A polymer as in claim 1 composed of recurring structural units of the formula
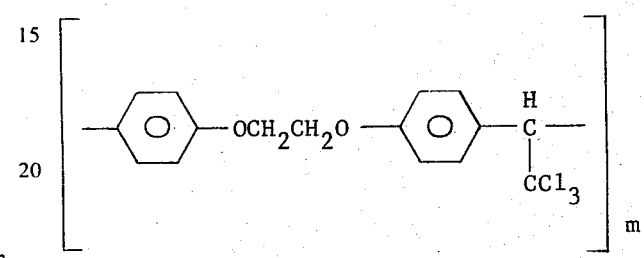
where *m* is a whole number greater than 1.
* * * * *